(12) United States Patent
Mori et al.

(10) Patent No.: US 10,507,618 B2
(45) Date of Patent: Dec. 17, 2019

(54) TUBULAR BODY

(71) Applicant: UCHIYAMA MANUFACTURING CORP., Okayama (JP)

(72) Inventors: Masayuki Mori, Okayama (JP); Katsunori Matsuki, Okayama (JP)

(73) Assignee: UCHIYAMA MANUFACTURING CORP., Okayama-Shi, Okayama (JP)

( * ) Notice: Subject to any disclaimer, the term of this patent is extended or adjusted under 35 U.S.C. 154(b) by 0 days.

(21) Appl. No.: 15/711,426

(22) Filed: Sep. 21, 2017

(65) Prior Publication Data
US 2018/0093421 A1    Apr. 5, 2018

(30) Foreign Application Priority Data

Sep. 30, 2016   (JP) .................. 2016-192837

(51) Int. Cl.
*F16L 9/00* (2006.01)
*B29C 65/42* (2006.01)
(Continued)

(52) U.S. Cl.
CPC ............ *B29C 65/42* (2013.01); *B29C 45/006* (2013.01); *B29C 45/1671* (2013.01); *B29C 66/1312* (2013.01); *B29C 66/301* (2013.01); *B29C 66/5472* (2013.01); *F02M 35/1036* (2013.01); *F02M 35/10321* (2013.01); *F02M 35/10354* (2013.01); *F16L 9/22* (2013.01); *F16L 47/02* (2013.01); *B29C 65/06* (2013.01); *B29C 65/08* (2013.01); *B29C 65/16* (2013.01); *B29C 65/20* (2013.01); *B29C 65/48* (2013.01); *B29C 65/483* (2013.01); *B29C 65/4815* (2013.01);
(Continued)

(58) Field of Classification Search
CPC . F16L 9/22; F16L 47/02; B29C 65/42; F02M 35/10321
USPC .......................... 138/109, 160, 158, 163, 171
See application file for complete search history.

(56) References Cited

U.S. PATENT DOCUMENTS 253,854 A * 2/1882 Dimmick ................ B22C 21/02
164/393
1,360,774 A * 11/1920 Mooney .................. B64C 1/065
105/416
(Continued)

FOREIGN PATENT DOCUMENTS

JP            5444926 B2        3/2014

*Primary Examiner* — James F Hook
(74) *Attorney, Agent, or Firm* — Muncy, Geissler, Olds & Lowe, P.C.

(57) ABSTRACT

A tubular body formed by joining two semi-tubular portions that are divided in radial direction, the tubular body having a connection flange portion provided with a bolt hole on at least one end portion. The two semi-tubular portions have joint projection portions at both edge portions in circumferential direction, the joint projection portions projecting in radial direction and extending in axial direction, and each joint projection portion of the semi-tubular portions on at least one of both sides in circumferential direction is configured to be bent so as to deviate from a virtual division face passing a central axis in such a manner that a joint portion formed by abutting the joint projection portions does not interfere with a tool for fastening a bolt inserted into the bolt hole in a predetermined area in the vicinity of the bolt hole of the connection flange portion.

4 Claims, 4 Drawing Sheets

(51) Int. Cl.
  *B29C 45/16* (2006.01)
  *F16L 47/02* (2006.01)
  *F16L 9/22* (2006.01)
  *B29C 65/00* (2006.01)
  *B29C 45/00* (2006.01)
  *F02M 35/10* (2006.01)
  *B29L 23/00* (2006.01)
  *F16L 11/08* (2006.01)
  *B29L 31/00* (2006.01)
  *B29C 65/08* (2006.01)
  *B29C 65/16* (2006.01)
  *B29C 65/20* (2006.01)
  *B29C 65/48* (2006.01)
  *B29C 65/78* (2006.01)
  *B29C 65/06* (2006.01)

(52) U.S. Cl.
  CPC ...... *B29C 65/7808* (2013.01); *B29C 65/7814* (2013.01); *B29C 66/7212* (2013.01); *B29C 66/73921* (2013.01); *B29C 66/73941* (2013.01); *B29C 2045/0063* (2013.01); *B29L 2023/00* (2013.01); *B29L 2023/004* (2013.01); *B29L 2031/7492* (2013.01); *F16L 11/08* (2013.01)

(56) References Cited

U.S. PATENT DOCUMENTS

| | | | | |
|---|---|---|---|---|
| 2,101,311 A * | 12/1937 | Duncan | B21C 37/29 | 138/156 |
| 2,736,451 A * | 2/1956 | Fogg | H02G 3/06 | 138/157 |
| 4,020,875 A * | 5/1977 | Akiba | H01P 3/12 | 138/128 |
| 4,112,568 A * | 9/1978 | Hale | B23P 15/22 | 138/156 |
| 4,336,958 A * | 6/1982 | Goetzinger | F16L 58/187 | 138/109 |
| 4,840,194 A * | 6/1989 | Berry | H02G 3/06 | 138/109 |
| 5,591,940 A * | 1/1997 | Bacso | F16L 21/06 | 138/109 |
| 5,992,369 A * | 11/1999 | Mehne | F02M 35/10078 | 123/184.21 |
| 6,247,500 B1 * | 6/2001 | McMahon | F16L 9/22 | 138/157 |
| 6,363,900 B1 * | 4/2002 | Homi | B29C 45/0062 | 123/184.21 |
| 7,740,731 B2 * | 6/2010 | Leontaridis | B29C 65/342 | 138/142 |
| 2001/0037836 A1 * | 11/2001 | Yoshitoshi | B21C 37/0803 | 138/115 |
| 2002/0050261 A1 * | 5/2002 | Miyahara | B29C 45/0062 | 123/184.61 |
| 2003/0075227 A1 * | 4/2003 | Lepoutre | F02M 35/10137 | 138/119 |
| 2004/0025955 A1 * | 2/2004 | Skinner | F16L 9/22 | 138/157 |
| 2005/0224125 A1 * | 10/2005 | Kajino | F16L 9/003 | 138/119 |
| 2005/0225121 A1 * | 10/2005 | Schoemann | B60H 1/00564 | 296/208 |
| 2007/0131015 A1 * | 6/2007 | Matsumura | B21C 37/108 | 72/368 |

* cited by examiner

TUBULAR BODY

BACKGROUND OF THE INVENTION

Field of the Invention

The present invention relates to a tubular body.

Description of the Related Art

Conventionally, a tubular body formed by joining semi-tubular portions that are divided in the radial direction is well known as a resin tubular body having a bent portion that has difficulty in being integrally molded by an injection molding and so on.

For example, Patent Literature 1 mentioned below discloses a tubular body formed by joining flanges extending along both ends of semi-tubular bodies in the circumferential direction.

CITATION LIST

Patent Literature

Patent Literature 1: Japanese Patent No. 5444926

SUMMARY OF THE INVENTION

Problems to be Solved by the Invention

A connection flange portion having a bolt hole for connecting a connection object is often provided for an end portion of the tubular body in the axial direction, i.e., the longitudinal direction. Such a tubular body having a flange constituting a joint portion of the semi-tubular body at both ends in the circumferential direction has a difficulty in fastening with bolts when the flange is positioned on the axis of the bolt hole of the connection flange portion, so that further improvement is desired.

The present invention is proposed in view of the above-mentioned problems. An object of the present invention is to provide a tubular body in which fastening performance of a bolt inserted into a bolt hole of a connection flange portion is improved while providing a joint projection portion extending in the axial direction for joining semi-tubular portions divided in the radial direction.

Means of Solving the Problems

In order to achieve the above-mentioned objects, a tubular body formed by joining two semi-tubular portions that are divided in radial direction is proposed, the tubular body having a connection flange portion provided with a bolt hole on at least one end portion. The two semi-tubular portions have joint projection portions at both edge portions in circumferential direction, the joint projection portions projecting in radial direction and extending in axial direction. Each joint projection portion of the semi-tubular portions on at least one of both sides in circumferential direction is configured to be bent so as to deviate from a virtual division face passing a central axis in such a manner that a joint portion formed by abutting the joint projection portions does not interfere with a tool for fastening a bolt inserted into the bolt hole in a predetermined area in the vicinity of the bolt hole of the connection flange portion.

In the embodiment of the present invention, the joint portion is formed by abutting the joint projection portions provided at both edge portions of two radially divided semi-tubular portions in the circumferential direction. Therefore, the joint strength is improved compared with a joint portion without such joint projection portions. In addition, each joint projection portion of at least one of both sides of the semi-tubular portions in the circumferential direction is configured to be bent as mentioned above. Therefore, when the bolt hole of the connection flange portion is required to be provided at a position substantially corresponding to the virtual division face of the semi-tubular portions or at the vicinity of the position, the virtual division face being the division face of a mold (parting line) being set in view of molding performance of the semi-tubular portions depending on the bending degree of the tubular body, the tool hardly interferes with the joint projection portion in case of fastening the bolt connecting the connection flange portion to the connection object, thereby improving the fastening performance. In other words, sometimes it is difficult to deviate the joint portion in the circumferential direction entirely along the axial direction in view of the molding performance of the semi-tubular portions without the joint portion disposed on the axis of the bolt hole of the connection flange portion, the bolt hole being determined in accordance with the relation with the connection object. Such a situation can be solved in such a manner that the joint portion in the predetermined area in the vicinity of the bolt hole of the connection flange portion is deviated from the other region by bending.

In the embodiment of the present invention, bent regions of the joint projection portions can be configured in such a manner that an edge portion of one of the semi-tubular portions in circumferential direction extends in tangential direction further than other region and that an edge portion of the other of the semi-tubular portions in circumferential direction is dent in circumferential direction further than the other region. A projecting piece can be provided on an inner circumferential side of the dent edge portion of the other of the semi-tubular portions in circumferential direction, the projecting piece being provided along an inner circumferential face of a region extending in tangential direction of one of the semi-tubular portions, the projecting piece constituting an inner circumferential face connected with an inner circumferential face of other region of the semi-tubular portions.

In the embodiment of the present invention, the inner circumferential side region of one of the semi-tubular portion extending in the tangential direction and having larger diameter than the other region is embedded with the projecting piece of the other semi-tubular portion, thereby suppressing pressure loss in the tubular body.

In the embodiment of the present invention, the connection flange portion can be integrally provided for one of the semi-tubular portions.

In the embodiment of the present invention, the joint portion of two semi-tubular portions is not located at the connection flange portion, so that the faces of the connection flange portions facing the connection object side are suppressed from forming steps.

Effects of the Invention

In the tubular body of the present invention, fastening performance of the bolt inserted into the bolt hole of the connection flange portion is improved while providing the joint projection portion extending in the axial direction for joining the semi-tubular portions divided in the radial direction.

DESCRIPTION OF THE EMBODIMENTS

Figure 1:
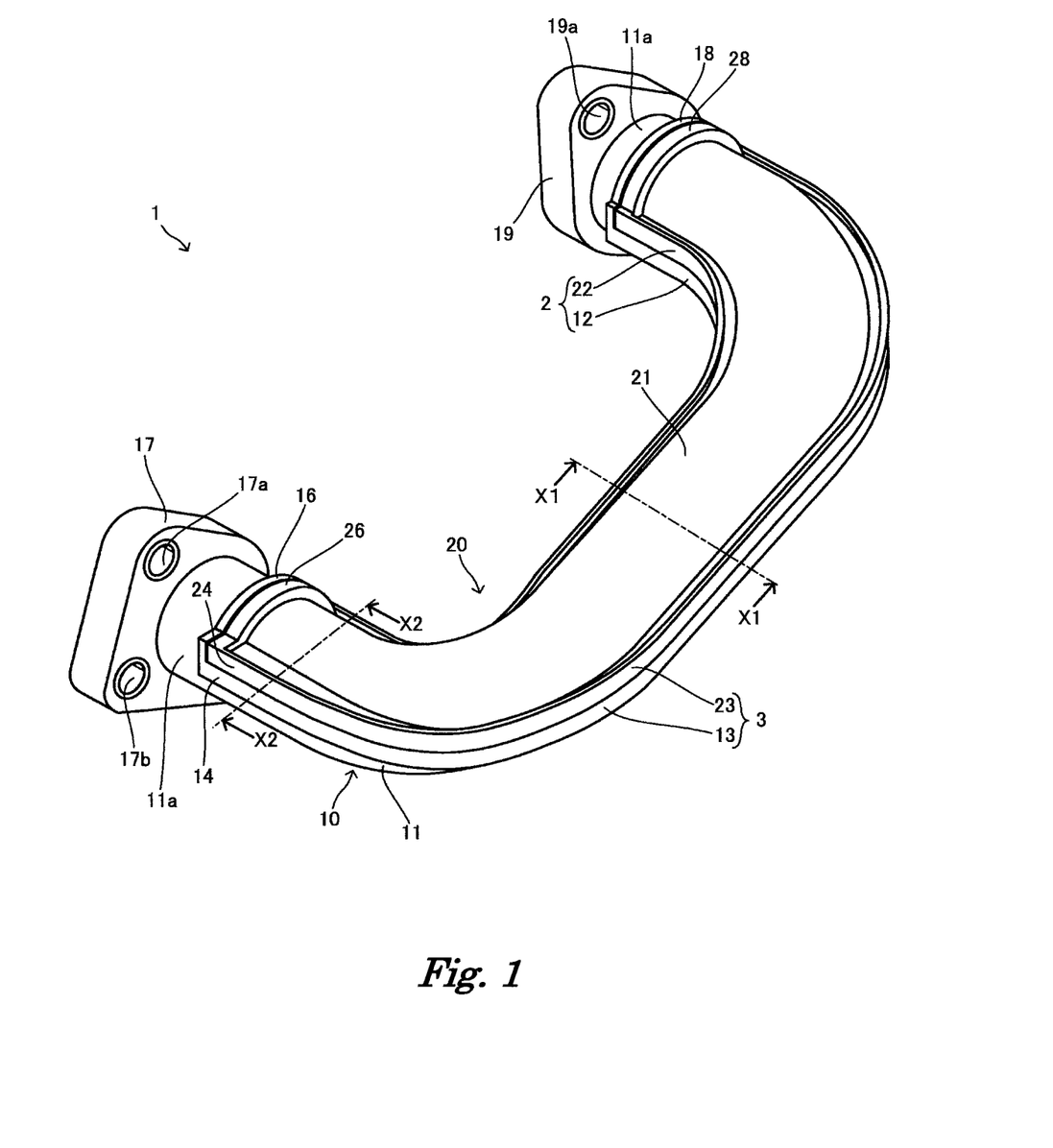
FIG. 1 is a diagrammatic perspective view schematically illustrating one example of a tubular body of the present invention.
Figure 2:
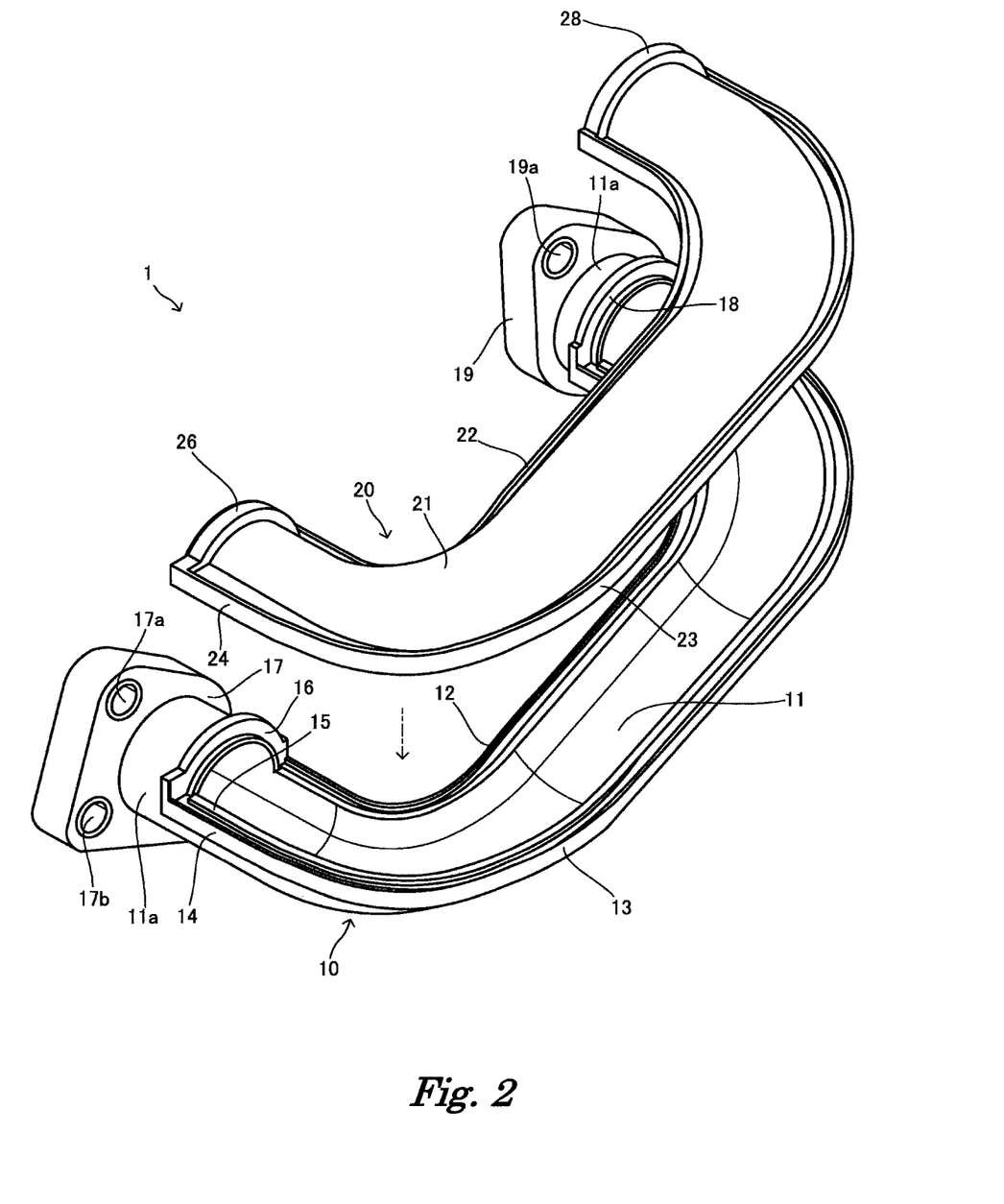
FIG. 2 is a diagrammatic exploded perspective view schematically illustrating the tubular body corresponding to FIG. 1.

Embodiments of the present invention are explained below with reference to the accompanying drawings. A tubular body 1 of an embodiment of the present invention is configured in such a manner that two semi-tubular portions 10, 20 divided in the radial direction are joined, and a connection flange portion 17 having a bolt hole 17b is provided for at least one end portion as illustrated in FIG. 1 and FIG. 2. In the embodiment, the tubular body 1 has the first connection flange portion 17 at one end portion in the axial direction and has a second connection flange portion 19 at the other end portion in the axial direction. Thus, the tubular body 1 has the connection flange portions 17, 19 respectively at both end portions in the axial direction, i.e., the longitudinal direction.

The tubular body 1 includes a pipe line that is arranged to flow fluid such as gas or liquid. For example, the tubular body 1 can be a cooling water tube for an engine or an intake manifold and can be used for a vehicle such as an automobile. The tubular body 1 is not limited to be used for a vehicle and can be used for a piping of gas equipment or water plumbing equipment.

The tubular body 1, not a straight tube, is in the form of a bent tube that is bent or curved around the middle region in the axial direction, and has at least one corner portion (a bent portion) as illustrated in FIG. 1. Such a bent tubular body 1 having the connection flange portion 17 at one end portion in the axial direction has difficulty in an integral molding. In the illustrated example, the tubular body 1 is formed like a 180-degree elbow pipe having two corner portions in which the connection flange portions 17, 19 at both end sides in the axial direction are directed in the same direction. Thus, the faces of the connection flange portions 17, 19 facing a connection object are parallel each other. Vicinity regions connected with each of the connection flange portions 17, 19 on both end sides of the tubular body 1 in the axial direction are in the form of a straight tube. The tubular body 1 is provided with a straight tube portion via the corner portions so as to connect the straight tube portions on both end sides in the axial direction.

Figure 3A:
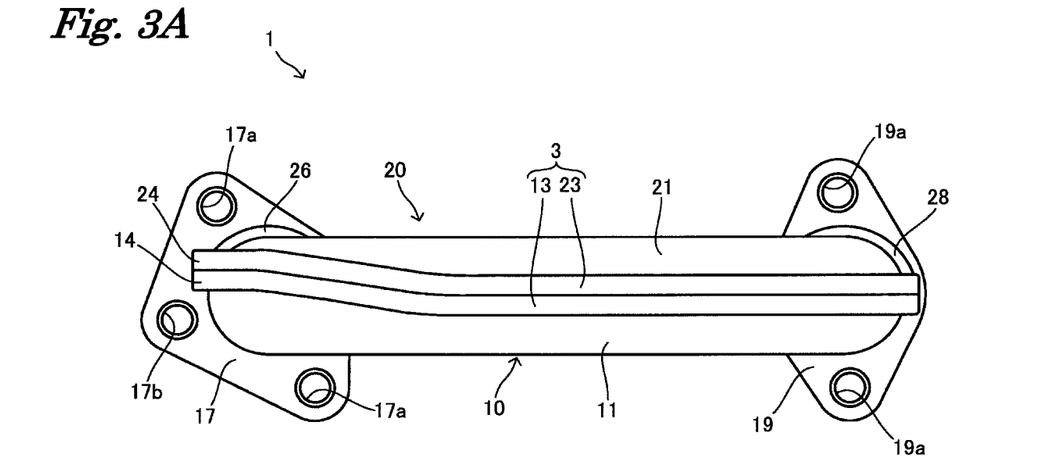
FIG. 3A is a diagrammatic front view schematically illustrating the tubular body.
Figure 3B:
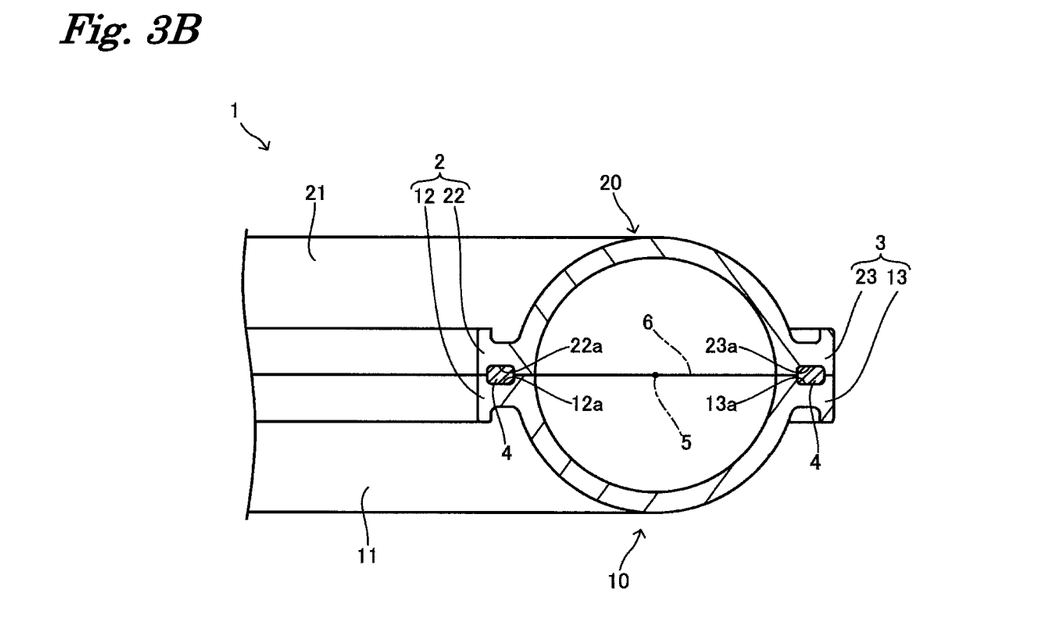
FIG. 3B is a partially broken diagrammatic vertical sectional view taken along the arrows X1 to X1 in FIG. 1.
Figures 4A, 4B:
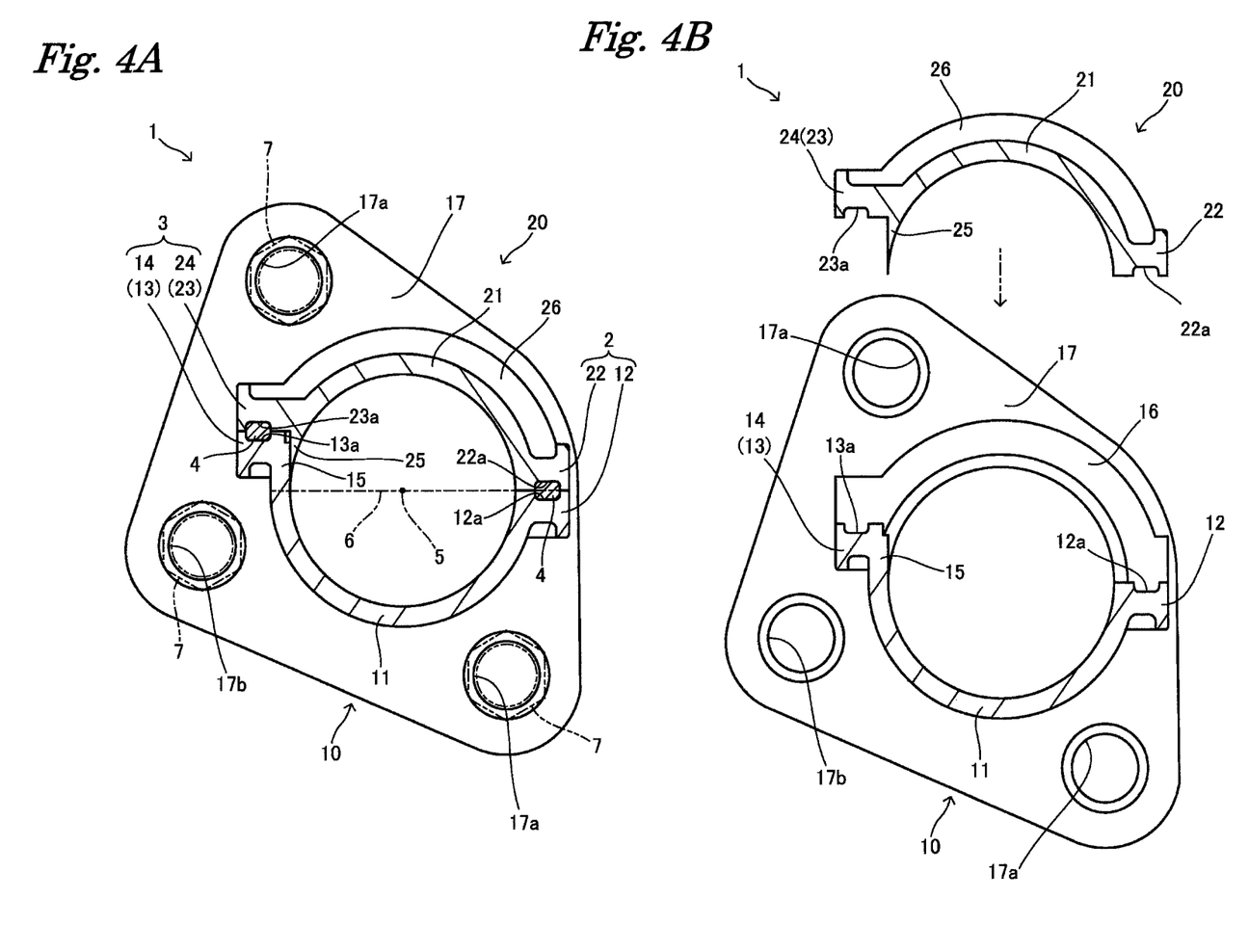
FIG. 4A is a diagrammatic vertical sectional view taken along the arrows X2 to X2 in FIG. 1.
FIG. 4B is a diagrammatic exploded vertical sectional view corresponding to FIG. 4A.

FIG. 3B and FIG. 4A illustrate an example in which the tubular body 1 is cylindrical in the form of a substantially true circle. The tubular body 1 is configured in such a manner that a central axis (a center of a circle) 5 is positioned on substantially the same flat face entirely along the axial direction, referring to FIG. 3A. Thus, a virtual division face 6 formed so as to virtually divide the tubular body 1 into two in the radial direction is substantially in the form of a flat face entirely along the axial direction. Namely, the figures illustrate that the tubular body 1 is in the form of a bent tube that is bent on substantially the same flat face. The tubular body 1 is not limited to be configured as mentioned above. The tubular body 1 can be provided with one corner portion, three or more corner portions, or the virtual division face 6 can be bent around the middle region in the axial direction. The tubular body 1 can be an ellipsoidal tube or a polygonal tube.

The tubular body 1 is made of synthetic resin including thermoset resin such as phenol resin, epoxy resin, and polyurethane resin, or thermoplastic resin such as polyethylene, polypropylene, ABS, acrylic, polycarbonate, polyimide, polyacetal, polyphenylenesulfide, polyetheretherketone. Synthetic resin with several additive agents can be used. For example, fiber reinforced resin including reinforcement fiber such as carbon fiber or glass fiber can be used. The tubular body 1 can partially include a metal region by an insert molding.

In this embodiment, as illustrated in FIG. 2, at least one of the connection flange portions 17, 19 is integrally provided for the first semi-tubular portion 10, i.e., one of the semi-tubular portions 10, 20. Specifically, the connection flange portions 17, 19 on both end sides in the axial direction are integrally provided for the first semi-tubular portion 10. Alternatively, the first connection flange portion 17 on one end side in the axial direction can be integrally provided for the first semi-tubular portion 10 and the second connection flange portion 19 on the other end side in the axial direction can be integrally provided for the second semi-tubular portion 20, the other semi-tubular portion.

The connection flange portions 17, 19 are respectively provided so as to project in the radial direction from the circumferential edge portions of the end portions of the first semi-tubular portion 10 in the axial direction. The connection flange portions 17, 19 can be provided along the entire circumferential edge portions of the end portions of the first semi-tubular portion 10 in the axial direction or can be partially provided along the circumferential edge portions. In this embodiment, as illustrated in FIG. 3A, the connection flange portions 17, 19 have an outline in the form of a substantial square when seen from the thickness direction, i.e., the axial direction (the opening direction) of each end portion of the first semi-circular portion 10.

The first connection flange portion 17 is configured to have three bolt holes 17a, 17a, 17b. At least one bolt hole 17b among the bolt holes 17a, 17a, 17b is provided at a position substantially corresponding to the virtual division face 6 or the vicinity region of the position, referring to FIG. 4A. In the figure, the bolt holes 17a, 17a are respectively provided for corner portions on both sides of the first connection flange portion 17 in the direction perpendicular to the virtual division face 6, and the bolt hole 17b is provided for a corner portion opposite to the second connection flange portion side so as to be positioned at a vicinity region on the same flat plane as the virtual division face 6. When a second joint portion 3 bent to be mentioned later is provided without bending and the first connection flange portion 17 side is seen in the axial direction, the bolt hole 17b is at a position close to the second joint portion 3 or at a position where the second joint portion 3 is partially overlapped. Thus, when the bent region to be mentioned later is not provided at a region on the side of the first connection flange portion 17 of the second joint portion 3, the bolt hole 17b is positioned where a tool for fastening the bolt 7 inserted into the bolt hole 17b interferes with the second joint portion 3. The corner portions of the first connection flange portion 17 provided with the bolt holes 17a, 17a, 17b are configured to project further than the remaining corner portion.

The second connection flange portion 19 has two bolt holes 19a, 19a. In the figure, the bolt holes 19a, 19a are respectively provided for the corner portions on both sides of the second connection flange portion 19 in the direction perpendicular to the virtual division face 6. As mentioned above, the corner portions of the second connection flange portion 19 provided with the bolt holes 19a, 19a are configured to project further than the remaining corner portions.

The bolt holes 17a, 17a, 17b, 19a, 19a of the connection flange portions 17, 19 can be constituted with a metal tubular member embedded by an insert molding.

Joint projection portions 12, 13, 22, 23 projecting in the radial direction and extending in the axial direction are provided for both edge portion of the two semi-tubular portions 10, 20 in the circumferential direction. The semi-tubular portions 10, 20 have the joint projection portions 12, 13, 22, 23 at both edge portions of semi-tubular main bodies 11, 21 in the form of a half cylinder in the circumferential direction so as to project outward in the radial direction, as illustrated in FIG. 3B. The joint portions 2, 3 are formed on both sides of the tubular body 1 in the circumferential direction so as to extend in the axial direction in such a manner that the joint projection portions 12, 13, 22, 23 on both sides of the semi-tubular portions 10, 20 are abutted. The joint projection portions 13, 23 on at least one of both sides of the semi-tubular portions 10, 20 in the circumferential direction are respectively bent so as to deviate from the virtual division face 6 along the central axis 5 in such a manner that the joint portion 3 formed by abutting the joint projection portions 13, 23 does not interfere with the tool for fastening the bolt 7 inserted into the bolt hole 17b in a predetermined area around the bolt hole 17b of the connection flange portion 17.

The joint portions 2, 3 of the tubular body 1 on both sides in the circumferential direction are positioned corresponding to the virtual division face 6 almost entirely along the axial direction, except for the above-mentioned bent region deviating from the virtual division face 6.

In the embodiment, a first joint portion 2 provided along the connection object side in the straight tubular portion around the central region in the axial direction is positioned corresponding to the virtual division face 6 almost entirely along the axial direction. Thus, the first joint projection portions 12, 22 of the semi-tubular portions 10, 20 constituting the first joint portion 2 are provided in such a manner that the abutting faces substantially accord with the virtual division face 6 entirely along the axial direction.

The second joint portion 3 provided along the opposite side of the connection object in the straight tubular portion around the central region in the axial direction is bent so as to deviate from the virtual division face 6 at the vicinity region of the first connection flange portion 17. Thus, in the embodiment, the second joint portion 3 is configured to be bent so as to deviate from the virtual division face 6 at the vicinity region of the first connection flange portion 17 in such a manner that the second joint portion 3 does not interfere with the tool for fastening the bolt 7 inserted into the bolt hole 17b provided for the corner portion of the first connection flange portion 17 on the opposite side of the second connection flange portion 2.

The bent region in the vicinity of the first connection flange portion 17 of the second joint portion 3 is provided so as to gradually deviate from the virtual division face 6 toward the first connection flange portion 17 side from the end portion on the first connection flange portion 17 side of the straight tubular portion around the central region in the axial direction. The predetermined area of the second joint portion 3 that is bent in the vicinity of the first connection flange portion 17 is determined appropriately depending on the bent shape of the tubular body 1 and the position of the bolt hole 17b in such a manner that the second joint portion 3 does not interfere with the tool for fastening the bolt 7 inserted into the bolt hole 17b. The figure illustrates an example in which the bent region in the vicinity of the first connection flange portion 17 of the second joint portion 3 is provided so as not to be positioned on the axis of the bolt hole 17b, i.e., on the axis of the bolt 7 to be inserted through the bolt hole. The region of the second joint portion 3 except for the vicinity region of the first connection flange portion 17 is positioned corresponding to the virtual division face 6 entirely along the axial direction. Thus, flange side regions 14, 24 that are bent regions, or vicinity regions of the first connection flange portion 17, of the second joint projection portions 13, 23 of the semi-tubular portions 10, 20 constituting the second joint portion 3 are positioned in such a manner that the abutting faces deviate from the virtual division face 6 toward the direction substantially along the circumferential direction. The second joint projection portions 13, 23 of the semi-tubular portions 10, 20 excluding the flange side regions 14, 24 are provided in such a manner that the joint faces substantially accord with the virtual division face 6 entirely along the axial direction as mentioned above.

The flange side regions 14, 24 of the second joint projection portions 13, 23 are configured in such a manner that the edge portion of the first semi-tubular portion 10, one of the semi-tubular portions 10, 20, in the circumferential direction extends into the tangential direction further than the other region, and the edge portion of the second semi-tubular portion 20, the other semi-tubular portion, is dent in the circumferential direction further than the other region, as illustrated in FIG. 4. Thus, the flange side region 14 of the first semi-tubular portion 10 is provided at an extending region 15 formed by extending the edge portion of the semi-tubular main body 11 on the second joint projection portion 13 side into the tangential direction perpendicular to the virtual division face 6. The extending region 15 is formed in such a manner that the extending dimension in the tangential direction gradually increases from the end on the first connection flange portion 17 side of the region constituting the straight tubular portion at the central region in the axial direction to the first connection flange portion 17 side. The extending region 15 extends in the tangential direction, so that the inner circumferential face does not become a concave curve face like a cylindrical inner circumferential face that is similar to the inner circumferential face of other region and the inner circumferential face is flat seen from the axial direction. The flange side region 24 of the second semi-tubular portion 20 is provided where the edge portion of the semi-tubular main body 21 on the second joint projection portion 23 side is dent in the circumferential direction corresponding to the extending region 15 of the first semi-tubular portion 10 formed as mentioned above. The flange side regions 14, 24 of the semi-tubular portions 10, 20 are provided in such a manner that the abutting faces are parallel to the virtual division face 6.

This embodiment includes a projecting piece 25 on the inner circumferential side of the dent edge portion of the second semi-tubular portion 20 in the circumferential direction; the projecting piece 25 being provided along the inner circumferential face of the extending region 15 of the first semi-tubular portion 10 and constituting an inner circumferential face connected with the inner circumferential face of the other region of the semi-tubular portions 10, 20. The projecting piece 25 is provided so as to project in the substantially circumferential direction from the dent edge portion of the semi-tubular main body 21 of the second semi-tubular portion 20. The projecting piece 25 is tapered off toward the tip end in the projecting direction. The outer circumferential face of the projecting piece 25 is flat seen from the axial direction so as to abut or to be close to the inner circumferential face of the extending region 15 that is flat as mentioned above when the semi-tubular portions 10, 20 abut. The inner circumferential face of the projecting piece 25 is a concave curve face like a cylindrical inner circumferential face similar to the inner circumferential face of the other region of the semi-tubular main body 21 of the second semi-tubular portion 20. The projecting piece 25 is configured in such a manner that the tip end portion in the projecting direction is substantially positioned on the virtual division face 6. The projecting piece 25 is configured in such a manner that the projecting dimension from the edge portion gradually increases toward the first connection flange portion 17 side from the end portion on the first connection flange portion 17 side of the region constituting the straight tubular portion at the central region in the axial direction.

In this embodiment, the joint faces of the joint projection portions 12, 13, 22, 23 of the semi-tubular portions 10, 20 are provided with joint resin filling grooves 12a, 13a, 22a, 23a opening in the direction facing each other so as to extend in the axial direction. In this embodiment, the semi-tubular portions 10, 20 are joined via joint resin (secondary resin) 4 filled in the joint resin filling grooves 12a, 13a, 22a, 23a. In addition to the above-mentioned resin, the joint resin 4 can be resin having the same component as that of the semi-tubular portions 10, 20, or resin with different components. The inner circumferential sides of the joint resin filling grooves 12a, 13a, 22a, 23a of the joint faces of the joint projection portions 12, 13, 22, 23 can be provided with an engagement projection or an engagement groove so as to be engaged and to suppress misalignment and leakage of the joint resin 4 into the inner circumferential side.

Both ends of the first semi-tubular portion 10 in the axial direction are respectively provided with short tube portions, i.e., short cylindrical portions, 11a, 11a so as to be connected with the connection flange portions 17, 19 on both end sides as illustrated in FIG. 2. Thus, in this embodiment, the semi-tubular main body 11 of the first semi-tubular portion 10 is not in the form of a semi-tube (semi-cylinder) entirely along the axial direction and is provided with the short tube portions 11a, 11a on both end portions in the axial direction. Flange-like portions 16, 18 projecting outward in the radial direction is provided at the circumferential edge portions from which the short tube portions 11a, 11a expose so as to extend in the circumferential direction, the circumferential edge portions constituting boundary portions of the short tube portions 11a, 11a on both sides in the axial direction and the semi-tubular (semi-cylindrical) region.

The flange-like portion 16 on the first connection flange portion 17 side is provided in such a manner that one end portion in the circumferential direction is connected with the first joint projection portion 12, and the other end portion in the circumferential direction is connected with the flange side region 14 of the second joint projection portion 13. The flange-like portion 18 of the second connection flange portion 19 side is provided in such a manner that one end portion in the circumferential direction is connected with the first joint projection portion 12 and the other end in the circumferential direction is connected with the second joint projection portion 13.

The semi-tubular main body 21 of the second semi-tubular portion 20 is in the shape of a semi-tube (semi-cylinder) entirely along the axial direction, unlike the first semi-tubular portion 10. The flange-like portions 26, 28 projecting outward in the radial direction are provided at both end portions of the second semi-tubular portion 20 in the axial direction so as to extend in the circumferential direction. The flange-like portion 26 on the first connection flange portion 17 side is provided in such a manner that one end portion in the circumferential direction is connected with the first joint projection portion 22 and the other end portion in the circumferential direction is connected with the flange side region 24 of the second joint projection portion 23. The flange-like portion 26 on the first connection flange portion 17 side of the second semi-tubular portion 20 and the flange-like portion 16 on the first connection flange portion 17 side of the first semi-tubular portion 10 are abutted and constitute a joint portion on one end side in the axial direction. The flange-like portion 28 on the second connection flange portion 19 side is provided in such a manner that one end portion in the circumferential direction is connected with the first joint projection portion 22 and the other end portion in the circumferential direction is connected with the second joint projection portion 23. The flange-like portion 28 on the second connection flange portion 19 side of the second semi-tubular portion 20 and the flange-like portion 18 on the second connection flange portion 19 side of the first semi-tubular portion 10 are abutted and constitute a joint portion on the other end side in the axial direction.

The joint faces of the flange-like portions 16, 26, 18, 28 of the semi-tubular portions 10, 20 can be provided with the joint resin filling groove to be filled with the joint resin 4 as mentioned above. Or gaps to be filled with the joint resin 4 can be formed between the joint faces of the flange-like portions 16, 26, 18, 28 of the semi-tubular portions 10, 20.

The tubular body 1 as constituted above can be molded by DSI (Die Slide Injection) in which the semi-tubular portions 10, 20 are molded as a primary molded product, then one of the semi-tubular portions 10, 20 is slid relative to the other, and the tubular body 1 is molded by filling the joint resin 4, secondary resin, along the joint portions at both end portions in the axial direction and the joint portions 2, 3 on both sides in the circumferential direction. The semi-tubular portions 10, 20 constituting the tubular body 1 are not limited to be joined by the joint resin 4, the secondary resin. The semi-tubular portions 10, 20 can be joined by a joint method such as an adhesive agent, a hot plate welding, a vibration welding, a ultrasonic welding, or a laser welding.

The tubular body 1 in the embodiment constituted as mentioned above improves fastening performance of the bolt 7 to be inserted into the bolt hole 17b of the connection flange portion 17 while being provided with the joint projection portions 12, 13, 22, 23 extending in the axial direction for joining the semi-tubular portions 10, 20 divided in the radial direction.

Thus, the joint portions 2, 3 are constituted by abutting the joint projection portions 12, 13, 22, 23 provided on both edge portions of two radially divided semi-tubular portions 10, 20 in the circumferential direction, so that the joint strength is improved compared with the one without the joint projection portions 12, 13, 22, 23.

The region on the first connection flange portion 17 side of the second joint projection portions 13, 23 of the semi-tubular portions 10, 20 constitutes the flange side regions 14, 24 bent as mentioned above. Therefore, when the bolt hole 17b of the first connection flange portion 17 is provided at a position substantially corresponding to the virtual division face 6 of the semi-tubular portions 10, 20, namely a division face (parting line) set in view of molding performance of the semi-tubular portions 10, 20, or in the vicinity of the position, the tool hardly interferes with the flange side regions 14, 24 in case of fastening the bolt 7 connecting the first connection flange portion 17 to the connection object, thereby improving the fastening performance. In other words, sometimes it is difficult to deviate the second joint portion 3 in the circumferential direction entirely along the axial direction in view of the molding performance of the semi-tubular portions 10, 20 without the second joint portion 3 disposed on the axis of the bolt hole 17b of the first connection flange portion 17, the bolt hole being determined in accordance with the relation with the connection object. Such a situation can be solved in such a manner that the second joint portion 3 in a predetermined area in the vicinity of the bolt hole 17b of the first connection flange portion 17 is deviated from the other region by bending.

In the embodiment, the flange side regions 14, 24 of the second joint projection portions 13, 23 are configured in such a manner that the edge portion of the first semi-tubular portion 10 of the semi-tubular portions 10, 20 in the circumferential direction extends further than the other region in the tangential direction and the edge portion of the second semi-tubular portion 20 in the circumferential direction is dent in the circumferential direction further than the other region. Therefore, the formability of the first semi-tubular portion 10 that is larger than the divided-half one is improved with the second joint projection portions 13, 23 bent as mentioned above.

The inner circumferential side of the dent edge portion of the second semi-tubular portion 20 in the circumferential direction is provided with the projecting piece 25 that is arranged along the inner circumferential face of the extending region 15 extending in the tangential direction of the first semi-tubular portion 10 and that constitutes the inner circumferential face connected with the inner circumferential face of the other region of the semi-tubular portions 10, 20. Therefore, the inner circumferential side region of the extending region 15 that extends in the tangential direction of the first semi-tubular portion 10 and has larger diameter than the other region is embedded by the projecting piece 25 provided for the second semi-tubular portion 20, thereby suppressing pressure loss in the tubular body 1.

In the embodiment the connection flange portions 17, 19 on both sides in the axial direction are integrated with the first semi-tubular portion 10. Therefore, the joint portions 2, 3 of the semi-tubular portions 10, 20 are not positioned at the connection flange portions 17, 19, so that the faces of the connection flange portions 17, 19 facing the connection object side are suppressed from forming steps.

In the embodiment, the regions on the first connection flange portion 17 side of the second joint projection portions 13, 23 of the semi-tubular portions 10, 20 are bent. However, the other region can be bent corresponding to the position of the bolt holes provided for the connection flange portions 17, 19.

In the embodiment, the semi-tubular portions 10, 20 constituting the tubular body 1 and the joint portions 2, 3 formed by joining the semi-tubular portions 10, 20 are not limited to those mentioned above and can be modified. For example, the above-mentioned projecting piece 25 can be omitted. Or two semi-tubular portions 10, 20 can be divided in the connection flange portions 17, 19 on both end sides in the axial direction. In such a case, the flange-like portions 16, 18 on both end sides in the axial direction can be integrally provided for the connection flange portions 17, 19 without providing the short tube portions 11a, 11a on both end portions of the first semi-tubular portion 10 in the axial direction. Or the flange-like portions 16, 18 on both end sides in the axial direction can be constituted with part of the connection flange portions 17, 19. Thus, the first semi-tubular portion 10 and the second semi-tubular portion 20 can be divided in the axial direction, i.e., the thickness direction of the connection flange portion, in the connection flange portions 17, 19. In addition, the first semi-tubular portion 10 and the second semi-tubular portion 20 can be divided in the radial direction in the connection flange portions 17, 19 and other modifications are possible.

REFERENCE 1 tubular body
2 first joint portion (joint portion)
3 second joint portion (joint portion)
5 central axis
6 virtual division face
7 bolt
10 first semi-tubular portion (semi-tubular portion)
12 first joint projection portion (joint projection portion)
13 second joint projection portion (joint projection portion)
14 flange side region (bent region)
15 extending region (extended region)
17 first connection flange portion (connection flange portion)
17b bolt hole
20 second semi-tubular portion (semi-tubular portion)
22 first joint projection portion (joint projection portion)
23 second joint projection portion (joint projection portion)
24 flange side region (bent region)
25 projecting piece

The invention claimed is:

1. A tubular body formed by joining two semi-tubular portions that are divided in radial direction, the tubular body having a connection flange portion provided with a bolt hole on at least one end portion,
    wherein the two semi-tubular portions have joint projection portions at both edge portions in circumferential direction, the joint projection portions projecting in radial direction and extending in axial direction,
    wherein a joint portion formed by abutting each joint projection portion of the semi-tubular portions on at least one of both sides in circumferential direction has a region provided along a division plane passing a central axis of the tubular body, and has a bent region which is configured to be bent so as to deviate from the division plane between the region provided along the division plane and the connection flange portion,
    wherein the bolt hole is provided at a position where the joint portion is partially overlapped with the bolt hole with the connection flange portion side seen in an axial direction of the tubular body, when the joint portion is provided along the division plane along the entire axial direction, and
    wherein the bent region is positioned out of an axis of the bolt hole.

2. The tubular body as set forth in claim 1,
wherein bent regions of the joint projection portions are configured in such a manner that an edge portion of one of the semi-tubular portions in circumferential direction extends in tangential direction further than other region and that an edge portion of the other of the semi-tubular portions in circumferential direction is dent in circumferential direction further than the other region, and
wherein a projecting piece is provided on an inner circumferential side of the dent edge portion of the other of the semi-tubular portions in circumferential direction, the projecting piece being provided along an inner circumferential face of a region extending in tangential direction of one of the semi-tubular portions, the projecting piece constituting an inner circumferential face connected with an inner circumferential face of other region of the semi-tubular portions.

3. The tubular body as set forth in claim 2,
wherein the connection flange portion is integrally provided for one of the semi-tubular portions.

4. The tubular body as set forth in claim 1,
wherein the connection flange portion is integrally provided for one of the semi-tubular portions.

* * * * *